Nov. 7, 1933.      R. T. HASLAM      1,934,063
PROCESS FOR PRODUCING HEAVY HYDROCARBON OILS
Filed May 15, 1930
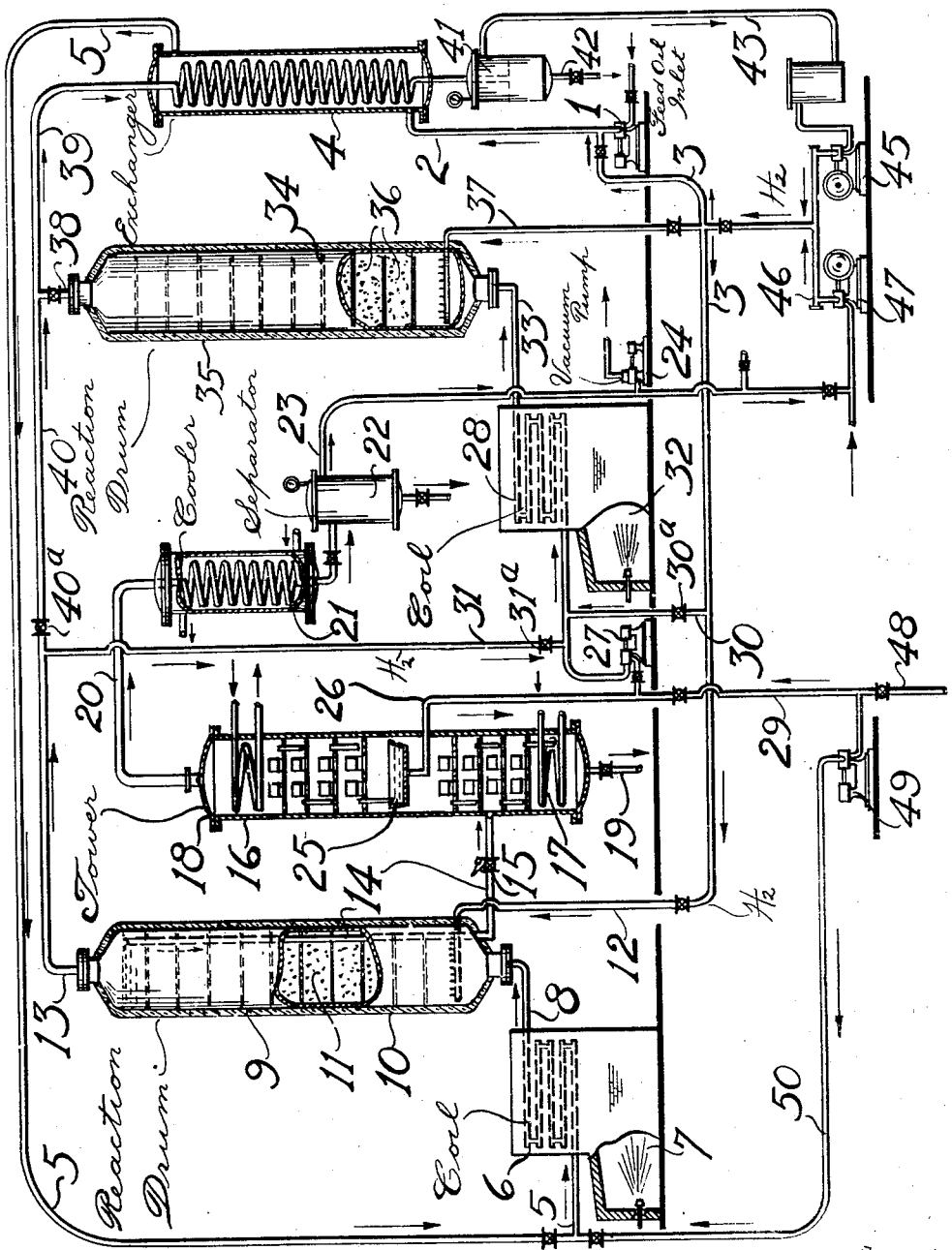

Patented Nov. 7, 1933

1,934,063

UNITED STATES PATENT OFFICE 1,934,063

PROCESS FOR PRODUCING HEAVY HYDROCARBON OILS

Robert T. Haslam, Westfield, N. J., assignor to Standard-I. G. Company

Application May 15, 1930. Serial No. 452,664

8 Claims. (Cl. 196—78)

The present invention relates to a process for improving hydrocarbon oils by treatment with hydrogen under elevated temperature and pressure and applies specifically to an improved process for the manufacture of high grade lubricating oils from reduced crude or suitable heavy fractions. My invention will be fully understood from the following description and drawing which illustrates one form of apparatus suitable for carrying out my invention.

The drawing shows diagrammatically in sectional elevation an apparatus constructed to carry out my invention and indicates the flow of the various materials in the process.

Referring to the drawing a hydrocarbon oil is fed from any convenient source by pump 1 into line 2 where it joins a stream of gas rich in hydrogen supplied by pipe 3. The mixture of oil and gas passes from line 2 to heat exchanger 4 and thence by line 5 to heating coil 6 mounted in a suitable furnace 7. The coil discharges through line 8 into reaction drum 9 which is provided with suitable insulation 10 and constructed to withstand temperatures in the neighborhood of 750 to 850° F. and pressures of 200 atmospheres or higher. The interior of the drum is filled with a catalytic material 11 which may be packed into the drum in any suitable manner, for example in small lumps or upon trays. Additional hydrogen gas may be added to the drum by means of line 12. The hydrogen and oil which is substantially all in the liquid phase, pass up simultaneously through the catalytic bed 11 where the oil is improved and a small percentage of low boiling oils are formed. These low boiling oils, which consist of naphtha or kerosene and the like, pass out of the drum as a vapor through line 13 in mixture with the gas.

The liquid phase oil is withdrawn at the top of the drum by line 14 and conducted through valve 15, where the pressure is reduced, to flash tower 16. Tower 16 may be provided with a heating coil 17 at the bottom and a cooling coil 18 at the top and may contain bubble caps or other suitable packing as needed. Heavy oil product may be withdrawn from the bottom of the tower through line 19. A small amount of light vapors and gas dissolved in the oil withdrawn from the reactor pass from the tower by means of line 20 to cooler 21 where the vapors are condensed. The condensate, which may consist of oils of a boiling range too low for lubricants, collects in separator 22 from which it may be withdrawn. Separated gas is removed by line 23 which is provided with vacuum pump 24 which may or may not be operated depending upon whether or not it is desired to operate tower 16 under a vacuum.

Oils of intermediate density and viscosity are withdrawn from the tower in any suitable manner, for example by pan 25 and line 26 and are forced by pump 27 into heating coil 28. If desired, oil from an external source may be supplied to line 26 by line 29 and connection 48. Hydrogen may be added to the oil entering coil 28 by line 30 and/or by line 31. Heating coil 28 is mounted in a suitable furnace setting 32 and discharges through line 33 to reaction drum 34 which is provided with insulation 35 and designed to withstand temperatures of 750 to 850° F. and pressures in excess of 200 atmospheres or more. The interior of the drum is filled with a catalytic material 36, which may or may not be of the same composition as catalyst 11 in drum 9. Additional hydrogen may be added to drum 34 by means of line 37. The hydrogen and oil pass up together through catalyst bed 36 and flow from the drum through line 38 and thence to heat exchanger 4 by means of line 39.

It will be understood that I may operate my process using but one reaction drum, whereby the oils of intermediate viscosity and density are recycled instead of passing to a second drum. In this type of operation, the oil from pan 25 would be passed through line 29 to pump 49 from which it would be recycled to coil 6 by means of lines 50 and 5. A portion of the stream in line 29 would be drawn off by connection 48 as finished light oil product. If it is desired to avoid sending the hydrogen and vapors from drum 9 through coil 28 and drum 34, the valve 31a in line 31 may be closed and valve 40a in line 40 may be opened, whereby the gas and vapors from drum 9 pass through lines 13, 40, and 39 to heat exchanger 4. With valve 40a closed and valve 31a open materials in line 13 will pass to coil 28 and drum 34. After cooling in heat exchanger 4 the gas and oil pass to separator 41 where the gas is separated from the oil, which oil may be withdrawn to storage through line 42. Gas passes off through pipe 43 to a suitable purification system 44 for removing gaseous hydrocarbons and sulfur containing compounds, such as scrubbing with heavy oils, soda ash solution, and the like. The purified gas flows to booster compressor 45 which discharges it into line 46. Fresh or make-up hydrogen is supplied to line 46 by compressor 47. If desired gas passing from separator 22 by line 23 may be added to the inlet supply of compressor 47. The gas in line 46 passes to line 3 for passage through the process as described.

In the operation of my improved process the feed stock consists of heavy hydrocarbon oils such as crudes or reduced crudes and may be stocks containing but small amounts of asphaltic materials, for example lubricating stocks.

It has been found that the lighter portions of the desired product obtained by the treatment of these feed stocks with hydrogen are not improved to as great an extent as the heavier portions. I therefore propose to separate these lighter fractions of the desired product and subject them to an additional stage of hydrogen treatment. The first treatment will be referred to as the primary stage, while that stage in which the lighter oils receive additional improvement will be known as the secondary hydrogenation stage.

The feed is heated preferably with hydrogen, to a temperature not exceeding about 830° F. by rapid passage through a heated coil at a high rate sufficient to prevent decomposition. The heated mixture then passes under high pressure to the reaction drum of the primary stage. The drum is packed with a suitable catalyst which may comprise the oxides and sulfides of elements of the sixth group of the periodic table, their mixtures with each other or with other compounds, such as zinc oxide, magnesia, lime or alumina, these being characterized by resistance to sulfur.

The primary reaction drum is preferably maintained at a temperature not in excess of 830° F. and ordinarily in the range between about 750 and 810° F., the heat of coil 6 and the heat of the reaction being sufficient to maintain the temperature of the drum which is suitably insulated. The pressure is held above about 20 atmospheres and preferably in excess of about 100 or 200 atmospheres, and may be as high as 1,000 atmospheres. An excess of hydrogen is used with the oil, preferably in the ratio of about 5,000 to 10,000 cubic feet of hydrogen per barrel of oil fed to the process. The oil feed rate to the primary stage is expressed in terms of the volume of the primary reaction drum and is preferably held between 0.3 and 1.2 volumes of oil per volume of reaction drum per hour, the poorer qualities of feed oil requiring more time than higher grade oils to produce equivalent products.

In their flow through the catalytic mass, reaction takes place between the hydrogen and the oil, thereby yielding lubricating oils of high quality as regards flash, sulfur content, and color, and which possess temperature-viscosity relationships tending toward those of Pennsylvania petroleum as distinguished from oils of the Texas coastal class. A small amount of oil boiling below 400° F. is formed in the reactor as side reaction product, but does not ordinarily amount to more than about 10 to 15 percent of the feed. The lubricating fractions, which comprise the major portion of the product, usually contain increased amounts of light oils such as spindle oils, transformer oils, pale oils and the like, equivalent to about 5 to 50 percent of the feed. The amount of these light oils in the product is dependent on the severity of the hydrogenation treatment and on the viscosity of the feed, a light viscosity feed stock yielding a high percentage of these oils while with more viscous charging stocks a smaller percentage is obtained. Similarly, a more intensive hydrogenation treatment produces a larger percentage of lower viscosity products, as will be understood. These low viscosity oils, as mentioned before, are not improved to the extent of the heavier fractions.

The product flowing from the primary reactor is therefore separated in such a way that the lighter lubricating fractions may be sent to the secondary hydrogenation stage. This separation may be carried out by any suitable means, for example by passing the product to a flash tower at a reduced pressure, from which several streams may be withdrawn. If desired this separation may take place in the presence of the hydrogen gas which passes through the primary reactor with the feed, or the gas together with a small amount of vapor formed in the process may be drawn off the reactor separately from the liquid oil as shown in drawing. The heavier fractions of the product are withdrawn from the process at this point while the lighter fractions, consisting of spindle oils, transformer oils, and the like are transferred to the secondary hydrogenation stage where they are subjected to treatment in apparatus similar to that in the primary stage.

The hydrogen used in the secondary stage may consist of that used in the primary stage, or fresh hydrogen, or both, may be employed. As in the primary stage, the hydrogen is used in excess, in an amount equivalent to about 5,000 to 10,000 cubic feet per barrel of oil. The oil is preheated, preferably in admixture with the hydrogen, and passed into the secondary reaction drum. This drum is packed with a suitable catalyst which may or may not be of the same composition as that in the primary reactor, but which preferably consists of the oxides or sulfides of the elements of the sixth group, their mixtures with each other, or with other compounds such as zinc oxide, lime, magnesia or alumina. The reactor is maintained at a temperature preferably between 750 and 810° F.

The pressure employed may be the same as that used in the primary reactor and is ordinarily in excess of 100, 200 or even 1,000 atmospheres. If a highly hydrogenating action is desired in the secondary reactor a pressure in excess of that in the primary stage may be used. The feed rate to the secondary reactor is dependent on the degree of improvement desired in the product and is lower for greater improvement, as will be understood. In general, the feed rate may be taken between 0.3 and 1.2 volumes of oil per volume of reactor per hour.

By utilization of this additional stage of treatment for the lighter oils, it is possible to improve them as regards flash, temperature-viscosity relationships, etc. in proportion with that obtained in the heavier oils, and if desired they may be improved to a greater extent. It will be understood that I may also substantially secure the same result by employing only one reaction stage in which case the light oils are re-passed one or more times through the reactor and the heavier oils are withdrawn after one passage. The method of carrying out this type of operation with the apparatus shown in the drawing has been described in a previous paragraph.

This invention is not to be limited by any theory of the mechanism of the reactions nor to any specific example which may have been given for purpose of illustration, but only by the following claims in which it is wished to claim all novelty inherent in this invention.

I claim:

1. In a process for preparing lubricating oils of high quality by subjecting heavy hydrocarbon oils to the action of a gas rich in free hydrogen at temperatures between 750 and 810° F. and under pressure in excess of 50 atmospheres for a limited time whereby an appreciable but restricted quantity of low boiling hydrocarbons is formed, the improvement which comprises conducting the treatment with hydrogen in two separate zones, removing the heavier lubricating fractions from the products of the first zone and forwarding only the lighter lubricating fractions to the second zone.

2. In a process for preparing lubricating oils of high quality from heavy hydrocarbon oils by subjecting such heavy hydrocarbon oils to the action of a gas rich in free hydrogen in a reaction zone maintained at temperatures between 750 and 810° F. and under pressure in excess of 50 atmospheres for a limited time whereby an appreciable but restricted quantity of low boiling hydrocarbons is formed, the improvement which comprises separating the lighter lubricating fractions from the products of the treatment and returning these lighter fractions to the reaction zone for further treatment.

3. Process according to claim 1 in which the lighter lubricating fractions are separated from the heavier lubricating fractions by reducing pressure on the liquid product withdrawn from the first zone whereby the lighter lubricating fractions are caused to vaporize.

4. Process according to claim 2 in which the lighter lubricating fractions are separated from the heavier lubricating fractions by reduction of pressure on the liquid products withdrawn from the reaction zone whereby the lighter lubricating fractions are caused to vaporize.

5. An improved process for preparing lubricating oils of high quality from heavy hydrocarbon oils which comprises subjecting such heavy oils to the action of a gas rich in free hydrogen in a reaction zone maintained at a temperature between 750 and 810° F. and under a pressure in excess of 50 atmospheres for a limited time whereby an appreciable but restricted quantity of low boiling hydrocarbons is formed, continuously removing vapors therefrom, separately withdrawing liquid products from the reaction zone, separating the lighter lubricating fractions therefrom and subjecting these lighter fractions to further treatment with hydrogen under substantially the same conditions.

6. Process according to claim 5 in which the liquid product withdrawn from the reaction zone is introduced into a rectification zone maintained under a substantially lower pressure than the reaction zone wherein the lighter lubricating fractions are separated from the hyrocarbons boiling in the motor fuel range and the high boiling heavy lubricating fractions.

7. Process according to claim 5 in which the treatment with hydrogen is carried out in the presence of a catalytic material which promotes the hydrogenation.

8. Process according to claim 5 in which the reaction zone is maintained under pressure in excess of 100 atmospheres.

ROBERT T. HASLAM.